April 21, 1953 W. E. FORD 2,635,454
METER TESTER MACHINE
Filed Dec. 28, 1949 2 SHEETS—SHEET 2
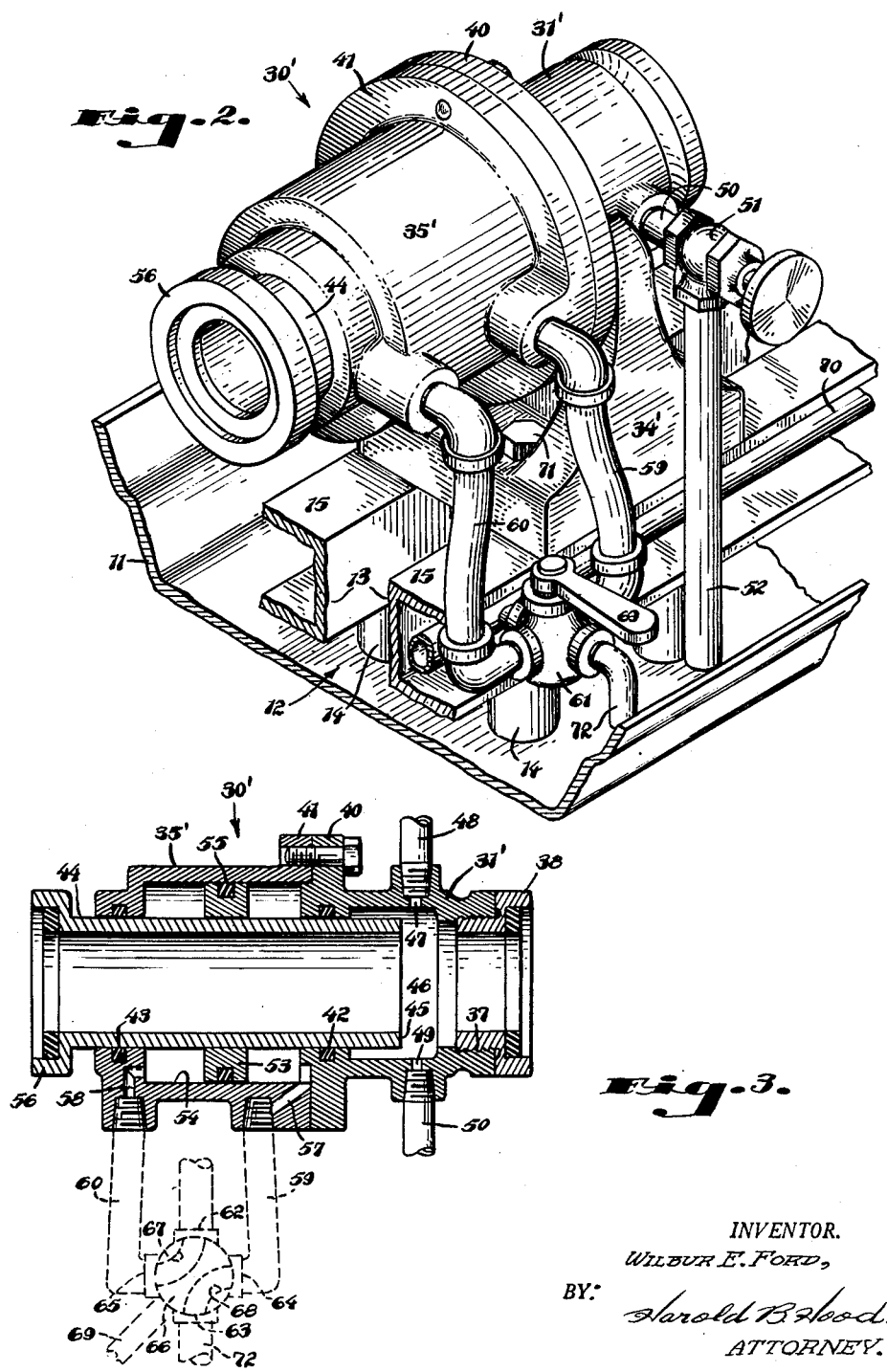
INVENTOR.
WILBUR E. FORD,
BY: Harold B Hood.
ATTORNEY.

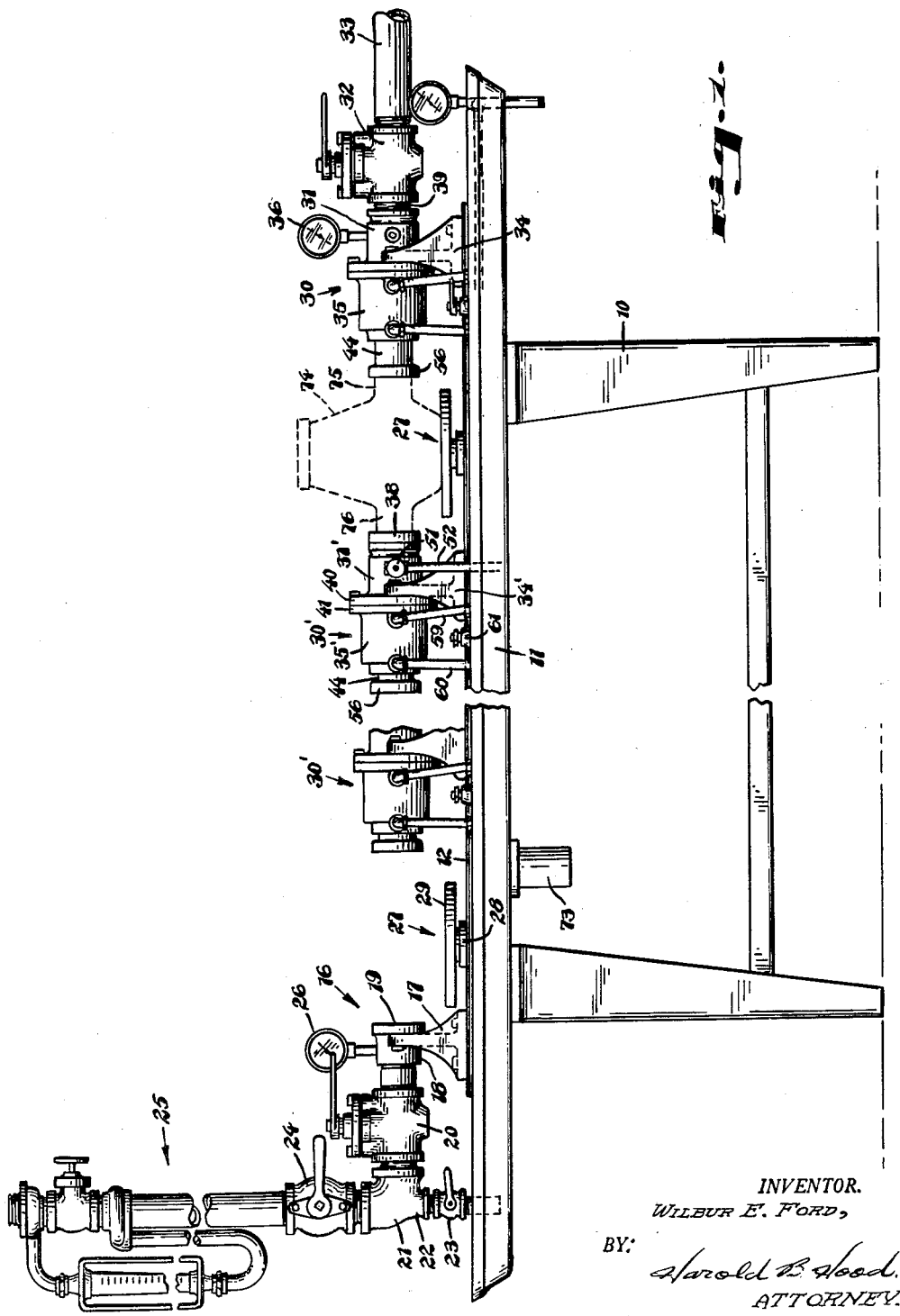

Patented Apr. 21, 1953

2,635,454

UNITED STATES PATENT OFFICE 2,635,454

METER TESTER MACHINE

Wilbur E. Ford, Wabash, Ind., assignor to The Ford Meter Box Company, Inc., Wabash, Ind., a corporation of Indiana Application December 28, 1949, Serial No. 135,489

2 Claims. (Cl. 73—3)

The present invention relates to a meter testing machine and, in the illustrated embodiment, more particularly to a machine for testing, checking and calibrating one or more standard water meters by producing liquid flow therethrough while measuring the flow rate, by means of a previously-calibrated flow-rate meter, and measuring the total volume of liquid passed through the meters, by collecting such liquid for actual measure.

The primary object of the invention is to provide improved structure for arranging a meter, or a plurality of meters connected in series, in a liquid flow line in a more facile manner than has heretofore been possible, and for holding the meters in such arrangement during a test run. A further object of the invention is to provide, in such a machine, means whereby each meter of a series may be operated to bring its dials to optimum condition before initiation of a test run. Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a front elevational view of a machine constructed in accordance with my invention;

Fig. 2 is a perspective view of a fragment thereof, showing one movable fitting and its associated parts drawn to an enlarged scale; and Fig. 3 is a longitudinal section through such a fitting, with its associated control valve more or less diagrammatically illustrated.

Referring more particularly to the drawings, it will be seen that the machine comprises a frame 10 upon which is mounted an upwardly opening tray 11, the machine being of any desired length, as is indicated by the break shown in Fig. 1. A trackway, indicated generally by the reference numeral 12, extends longitudinally throughout the major portion of the length of the tray 11, said trackway, in the illustrated embodiment of the invention, comprising a pair of allochirally arranged spaced channels 13 supported upon longitudinally spaced posts 14, and presenting upwardly facing surfaces 15 disposed in a common plane.

A fitting 16 having a base 17, which is preferably adjustably mounted on the trackway 12 adjacent one end of the machine, comprises a hollow barrel 18, one end 19 of which is open and is suitably shaped to receive the outlet spud of a standard water meter, as will appear more fully hereinafter. A valve 20 is connected to the opposite end of the barrel 18 to control flow therefrom to an elbow 21 having a drain passage 22 controlled by a valve 23. A valve 24 controls flow from the elbow 21 to a flow-rate meter 25 of conventional construction. A pressure gauge 26 preferably communicates with the interior of the barrel 18.

A meter support indicated generally by the reference numeral 27 comprises a base 28 suitably mounted to slide freely longitudinally of the trackway 12, and a table 29, preferably vertically adjustably carried by the base 28. The support 27 is known in the art as a "piano stool" support, and is intended to carry the weight of a meter to be connected between the fitting 16 and the fitting 30'.

Near the opposite end of the tray 11 there is mounted, preferably upon the trackway 12, a fitting indicated generally by the reference numeral 30 and including a member 31 adapted for communicating connection, through a valve 32, with a liquid supply line 33. The fitting 30 includes a base 34 and a housing 35 provided with an element 44 the details of which will be discussed hereinafter. Preferably, a pressure gauge 36 will communicate with the interior of the member 31 of the fitting 30.

A plurality of fittings 30', each substantially identical with the fitting 30, will be mounted in spaced relation along the length of the trackway 12. One such fitting 30' is illustrated in detail in Figs. 2 and 3. Each such fitting comprises a member 31' shaped for communicating connection with the outlet spud of a meter, and a housing 35' in which is reciprocably mounted an element 44 shaped for communicating connection to the inlet spud of a conventional meter. Each such fitting is supported upon a base 34' which, in turn, rests upon the surfaces 15 of the trackway 12 and is provided with means, such as the bolts 71, for clamping the base in any desired position of adjustment along the length of such trackway.

The open end of each member 31' is internally threaded as at 37 (Fig. 3), and is so proportioned as to receive a nipple such as that indicated at 39 in Fig. 1. Each of the fittings 30', however, receives in the open end of its member 31' an adapter such as that indicated at 38 in Fig. 3, such adapter being shaped to receive the outlet spud of a conventional meter in sealing relation.

The member 31', in the illustrated embodiment of the invention, is provided with an external flange 40 at its opposite end adapted to be secured to a mating flange 41 at the adjacent end of the housing 35'; and in the region of said flange 40, said member 31' is formed with an inwardly opening peripheral groove for receiving a packing ring 42. Adjacent its remote end, the housing 35' is formed with a similar groove for receiving a packing ring 43; and the element 44 is mounted for reciprocating sliding movement within the housing 35' and the member 31', the rings 42 and 43 bearing upon said element 44 in sealing relation.

The inner end of the element 44 projects into a chamber 46 formed in the member 31'. A port 47 opens from said chamber 46 and receives a pipe 48 which may lead to a gauge like the gauge 36. A second part 49 opens from the chamber 46 and receives a pipe 50 which, through a valve 51, leads to a drain pipe 52 whose function will be discussed hereinafter.

Intermediate its ends, the element 44 carries a piston 53 disposed within a chamber 54 provided in the housing 35', said piston being provided with an outwardly opening peripheral groove receiving a packing ring 55 having sealing engagement with the internal wall of the chamber 54. The piston is fixed to the element 44, so that said element will partake of all movements of said piston. At its outer end 56, the element 44 is shaped to receive the inlet spud of a conventional water meter.

A passage 57 opens from one end of the chamber 54 while a passage 58 opens from the other end thereof, conduits 59 and 60 being respectively connected to said passages and leading to a control valve 61. Said valve comprises a casing having an inlet port 62, an outlet port 63, a port 64 connected to the conduit 59, and a port 65 connected to the conduit 60. Rotatably mounted in said casing is a valve member having curved passages 67 and 68 formed therein. A handle 69 is connected to actuate the valve member in a manner which will appear hereinafter. A conduit 70 leads from a source of fluid under pressure to the inlet port 62 of the valve casing 61, and a conduit 72 is connected to the port 63 to discharge into the tray 11. A drain conduit 73 leads liquid from the tray 11 to a suitable point of disposal.

In Fig. 1, I have indicated in dotted lines a meter 74 carried on the support 27 between the fitting 30 and the next adjacent fitting 30', its inlet spud 75 being received in the end 56 of the projected element 44 of the fitting 30 and its outlet spud 76 being received in the adapter 38 of the member 31' of said next adjacent fitting 30'. Similar meters may be similarly mounted between successively adjacent fittings 30' and between the final fitting 30' and the fitting 16; or plain connector tubes (not shown) may be inserted, between any adjacent pairs of fittings, to complete the line of communication between the supply line 33 and the fitting 16.

Of course, valve 32 will be closed while the set-up is being made, while valves 20, 23 and 24 may be open or closed. Now, the valve 61 associated with the fitting nearest the fitting 16 is moved into a position such that its passage 68 provides communication between the ports 63 and 65 while its passage 67 establishes communication between the ports 62 and 64. Fluid under pressure will thus be supplied through the conduit 59 and ports 57 to the righthand end of the chamber 54, while the lefthand end of said chamber is connected to exhaust, whereby the piston 53 and the element 44 will be shifted toward the left to establish sealing pressure between the ends of the spuds of the meter arranged between those two fittings, and the washers in the member 19 and the element 44.

Now the valve 61 of the next adjacent fitting 30' will be similarly actuated to seal the meter arranged between that fitting and the first-mentioned fitting 30' in the line. This operation is continued, successively, with respect to each of the fittings 30' and finally with respect to the fitting 30, until the sealing of the meters and/or connector tubes has been completed. The valves 61 are left in the above-defined positions throughout the operation of the test, thereby holding all the seals in the line under full hydraulic pressure.

Now the valves 32, 20 and 24 are opened, whereby liquid will flow through the entire line and into the flow meter 25. If desired, air may first be scavenged from the assembly by opening the valve 23 and leaving the valve 24 closed until liquid begins to be discharged through the valve 23.

After the system has been filled to proper condition for starting a test, the valve 24 may be closed and, if the valve 23 is open, liquid will run through the system, and through all the meters, actuating such meters. When the dials of the meters connected to the fitting 16 reach a suitable datum condition, the operator will close the valve 23 to stop all flow. Now, the valve 51 of the next adjacent fitting 30' with which a meter is associated can be opened to cause the dials of that meter to operate until they reach a suitable datum condition. This operation will be repeated successively for each meter, from the lefthand end to the righthand end of the machine, as illustrated, until the dials of all meters are in suitable datum condition. Now, with all valves 51 closed and with the valve 23 closed, opening of the valve 24 will permit liquid to flow through the series of meters 74 and through the flow meter 25 to the collector. After a suitable volume of liquid has flowed through the system, reading of the meters will result in data from which the accuracy of the meters can be individually determined, and from which calibrations and other necessary operations may be made.

I claim as my invention:

1. In a fluid meter testing machine, a base, a fitting mounted on said base and adapted to be connected to fluid supply means and including an element shaped for connection to the inlet spud of a fluid meter, a second fitting mounted on said base and adapted to be connected to a flow-rate meter and including an element shaped and positioned for connection to the outlet spud of the same fluid meter, one of said elements being reciprocable toward and away from the other of said elements, fluid motor means for shifting said one element, and valve means connected to control the flow of fluid to and from said fluid motor means, said machine base including a trackway, one of said fittings being mounted on said trackway for movement therealong in the line of reciprocation of said one element, means for selectively securing said one fitting in any desired position of adjustment along said trackway, and meter support means comprising a base mounted on said trackway between said fittings for independent movement along said trackway and a table adjustable toward and away from said trackway upon a line substantially perpendicular to the line of movement of said meter support base along said trackway.

2. In a fluid meter testing machine, a base, a fitting mounted on said base and adapted to be connected to fluid supply means and including an element shaped for connection to the inlet spud of a fluid meter, a second fitting mounted on said base and adapted to be connected to a flow-rate meter and including an element shaped and positioned for connection to the outlet spud of the same fluid meter, one of said fittings comprising a housing formed to provide a chamber axially penetrated by the element for said fitting, said chamber being sealed at its opposite ends against fluid flow and said element carrying a piston within said chamber, said housing being provided with a passage opening into said chamber at one side of said piston and with a second passage opening into said chamber at the other side of said piston, and valve means, said valve means including a casing having an inlet port, an exhaust port, a third port connected to said first-named passage, and a fourth port connected to said second passage, and a valve element in said casing and movable between a position in which it establishes communication between said inlet port and said third port and between said exhaust port and said fourth port, and a position in which it establishes communication between said inlet port and said fourth port and between said exhaust port and said third port.

WILBUR E. FORD.

References Cited in the file of this patent

UNITED STATES PATENTS

| Number | Name | Date |
| --- | --- | --- |
| 537,037 | Heintzelman | Apr. 9, 1895 |
| 982,773 | Wood | Jan. 24, 1911 |
| 1,038,182 | Mueller | Sept. 10, 1912 |
| 1,134,316 | Collette | Apr. 6, 1915 |
| 1,167,392 | Ford | Jan. 11, 1916 |
| 1,994,675 | Weckerly | Mar. 19, 1935 |

OTHER REFERENCES

Publication: "Ford Setting and Testing Equipment for Water Meters," Cat. #46, Ford Meter Box Co.